Figure 6:
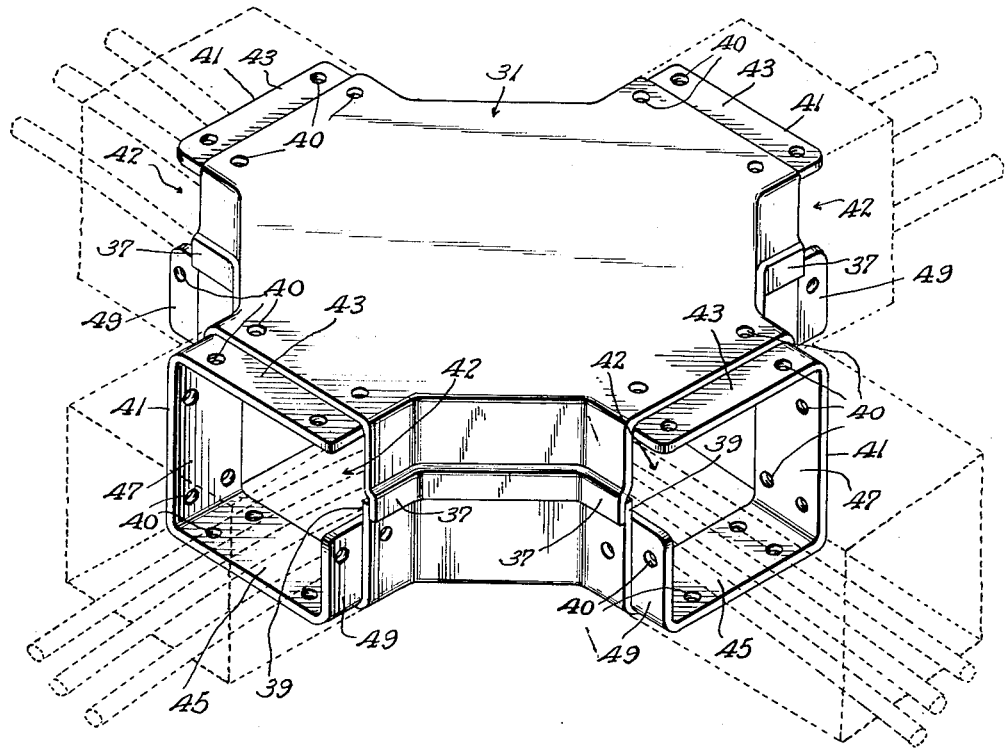

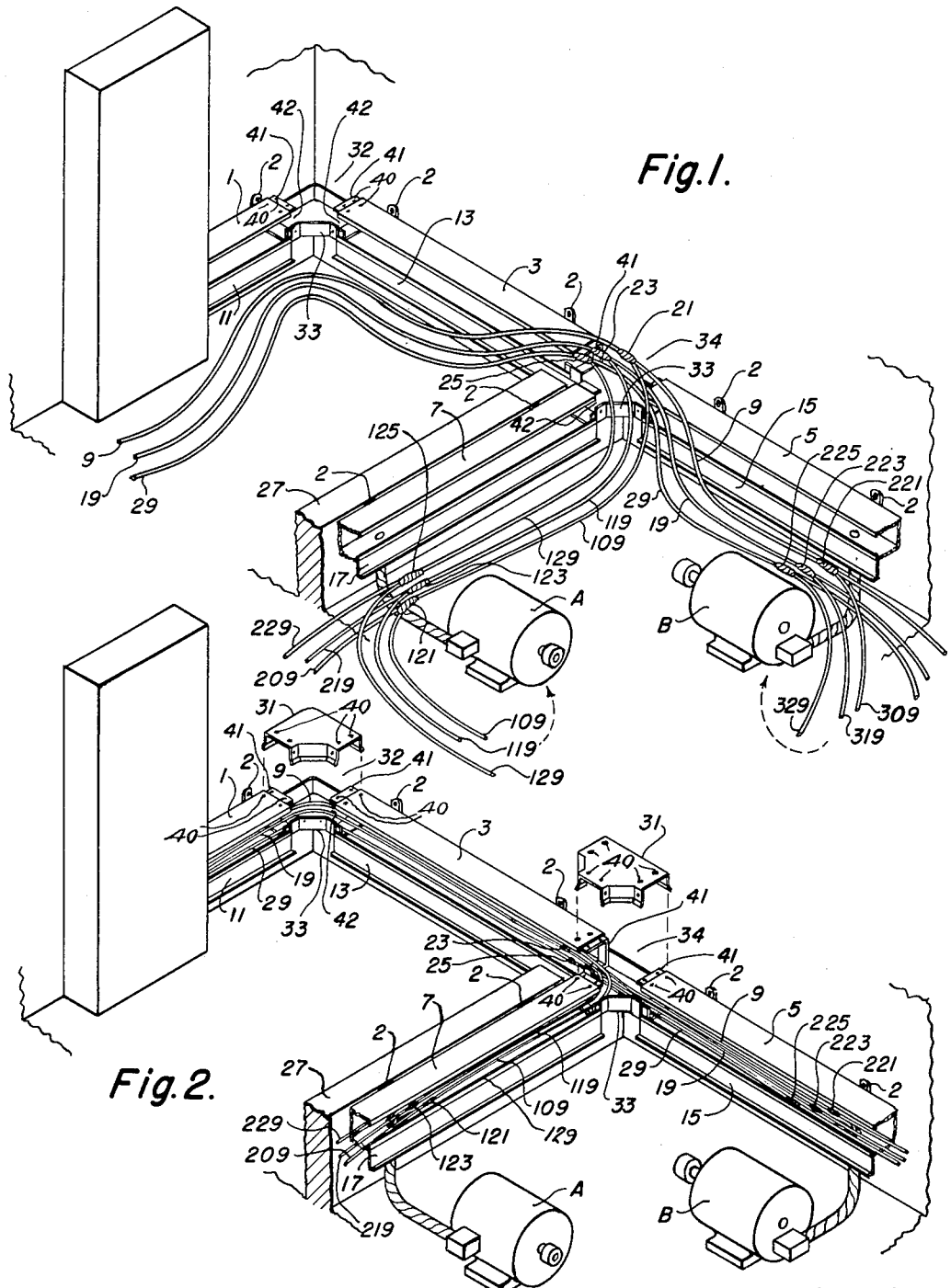

April 10, 1956   E. E. KUSSMAUL   2,741,499
RACEWAY FITTING PROVIDING ACCESS OPENING
Filed Aug. 18, 1951   3 Sheets-Sheet 2
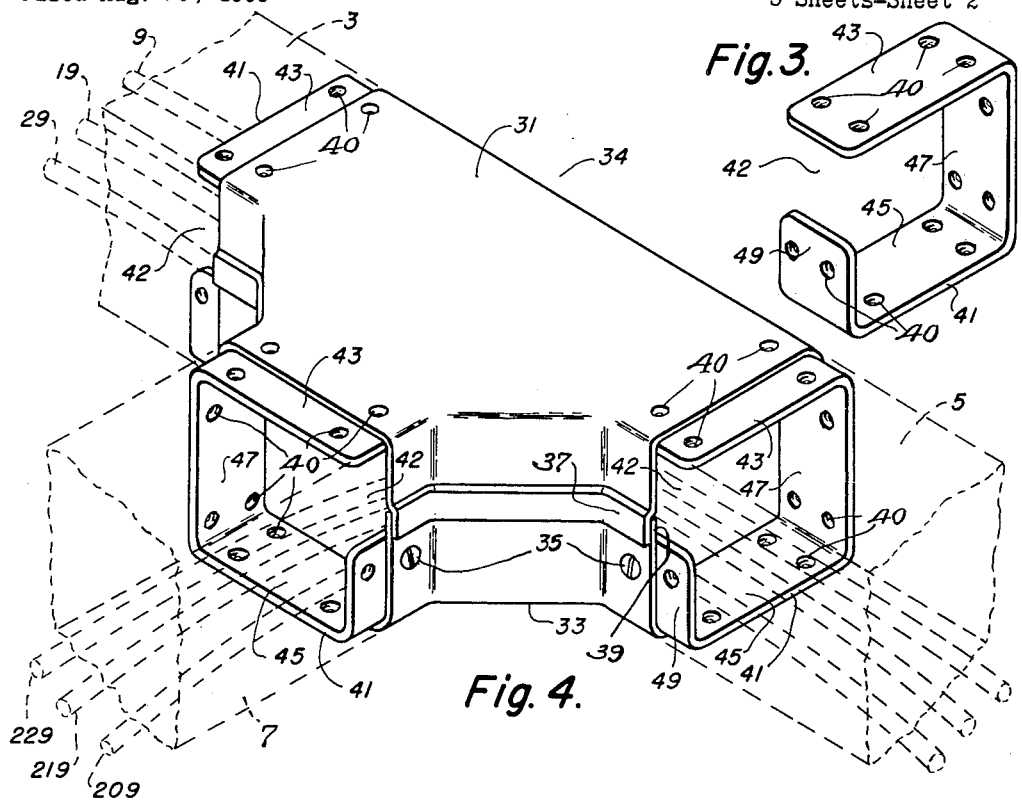
Fig. 3.
Fig. 4.
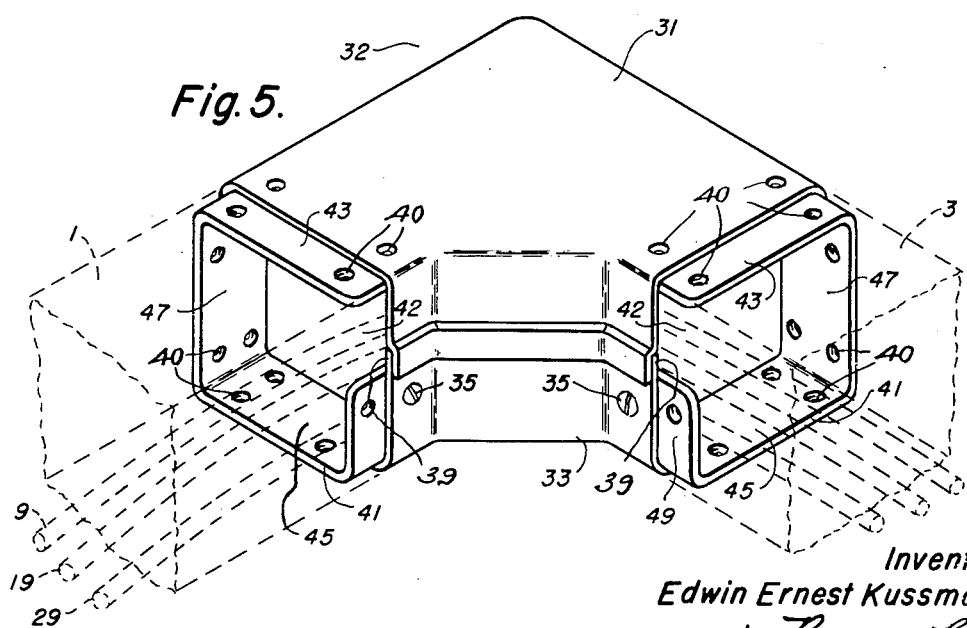
Fig. 5.
Inventor
Edwin Ernest Kussmaul
by Rines and Rines
Attorneys April 10, 1956  E. E. KUSSMAUL  2,741,499
RACEWAY FITTING PROVIDING ACCESS OPENING
Filed Aug. 18, 1951  3 Sheets-Sheet 3

INVENTOR.
Edwin Ernest Kussmaul
BY Rines and Rines

ATTORNEYS.

United States Patent Office 2,741,499
Patented Apr. 10, 1956

2,741,499

RACEWAY FITTING PROVIDING ACCESS OPENING

Edwin E. Kussmaul, Westwood, Mass., assignor to The Kelek Company, Brookline, Mass., a corporation of Massachusetts Application August 18, 1951, Serial No. 242,554

3 Claims. (Cl. 285—201.5)

The present invention relates to multiple-sided raceways, sometimes called wireways, for carrying wire tubes and similar conductors and, more particularly, to raceway fittings, such as T-fittings, cross-fittings and elbow-fittings. A raceway is defined in the National Electrical Code as any channel for holding wires, cables or bus-bars, which is designed expressly, and used solely, for this purpose.

Present-day multiple-sided raceway systems are utilized for such purposes as the carrying and concealing of electric wires, tubes and other conductors along walls, floors, ceilings and other surfaces, or within the walls, of rooms. The raceway is manufactured in sections that are joined or bound together, at their ends, by collars. These collars usually completely surround the raceway sections. One side of each raceway section is usually hinged, or is rendered otherwise removable, in order that an open space may be provided through which to insert the wire, tube or other conductors into the raceway. Fittings are provided, joining the raceway sections by complete collars, for carrying the conductors along one or more directions at an angle to the plane of one or more of the removable sides of one or more of the raceway sections. It is not possible so to insert these conductors into the raceway at the fittings where the sections thereof are joined together, however, because no space is provided through which to do so, since the collars, as before stated, completely surround the raceway. It therefore becomes necessary, at the junctions of the raceway sections, to perform the undesirable additional steps of feeding or threading the free ends of the wire or other conductors inside the collars or other fittings.

A further disadvantage is encountered when it is desired to distribute the conductors from a main raceway along a plurality of branching raceways of this character, as, for example, for the purpose of feeding electric energy to a plurality of differently located machines. Under these circumstances, the conductors are usually first laid out along the floor, alongside the main raceway. The electricians then strip the insulation off the conductors at predetermined points, after which they splice or otherwise join further conductors, at these points, for effecting the desired distribution to the differently located machines. It is at such points of splice that raceway-section fittings, such as T-fittings, cross-fittings and elbows, are employed, in order to permit the conductors to be carried by the branch raceway sections from the main raceway at the points of splice. The presence of the before-mentioned collars completely surrounding the adjacently disposed raceway sections, and also the construction of present-day raceway fittings, however, again require threading of the free ends of the conductors. The threading, moreover, must be done before the necessary splices are even effected. This is undesirably time-consuming and inefficient.

An object of the present invention is to obviate the present-day difficulties attendant upon the threading of the conductors into raceway fittings.

A further object of the present invention is to provide new and improved raceway fittings, such as T-fittings, cross-fittings and elbow-fittings, equipped with appropriate collars that, except at walls, ceilings and the like, shall eliminate the necessity for feeding the conductors through the raceway fittings. In accordance with the present invention, therefore, the electrician may first lay out, on the floor, and splice, all the conductors of the complete distribution system. He may then throw the conductors into the complete wireway system, without any threading or other further steps whatsoever.

Other and further objects will be described hereinafter, and will be more particularly pointed out in the appended claims.

In summary, the present invention comprises a novel fitting for a multiple-sided raceway one of the sides of which is open in order that the conductors wires or tubes may be inserted therethrough into the raceway. The fitting may carry the conductors along a direction out of the plane of the said one side and comprises members separable in a direction substantially parallel to the said plane and that, when connected together, provide multiple sides corresponding to, and that are adapted respectively to be disposed adjacent to, the respective sides of the raceway. A corresponding multiple-sided collar is provided for mounting upon the fitting, with its sides respectively in engagement with the sides of the fitting, at the junction of the fitting with the raceway. One of the sides of the collar is open to correspond to the open side of the raceway. This enables inserting the conductors into the fitting, as well as into the raceway, when the separable members of the fitting are separated.

Figure 7:
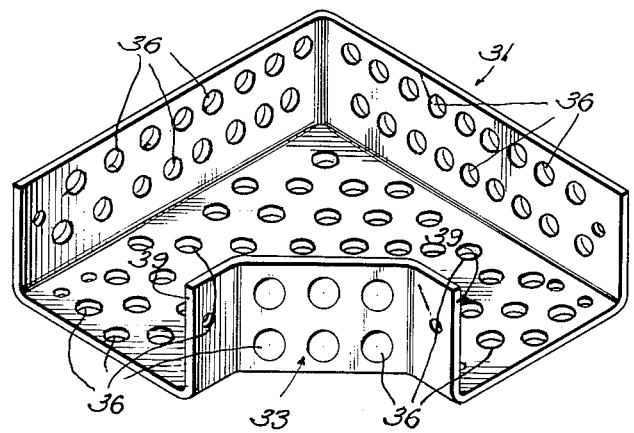

The invention will now be described more fully in connection with the accompanying drawings, Fig. 1 of which is a perspective illustrating an assembly of electric-wire conductors for feeding electric energy to a plurality of differently located electric machines, prior to the insertion of the conductors into a raceway system having elbow and T-fittings constructed in accordance with the present invention, the lower portions only of these fittings being shown; Fig. 2 is a similar perspective, showing the electric-wire conductors inserted into the raceway system, and showing also the upper portions of the fittings raised above the raceway system, ready to be mounted in place; Fig. 3 is a perspective, upon a larger scale, of a preferred collar for joining raceway sections, or for joining raceway fittings to such sections; Fig. 4 is a similarly enlarged perspective of a raceway T-fitting of the type shown in Figs. 1 and 2, provided with collars of the type shown in Fig. 3 and showing, by dotted lines, adjacently disposed raceway sections and conductors disposed therein; Figs. 5 and 6 are similar perspectives of raceway elbow- and cross-fittings, respectively; and Fig. 7 is a fragmentary perspective showing a modification.

A multiple-sided raceway system may comprise a plurality of joined or connected-together raceway sections, shown mounted, by means of brackets 2, upon the walls of a room, near the floor. It is to be understood that any other form of mounting may be employed. The raceway system is provided with a section 1, disposed along the left-hand wall of the room, as viewed in Figs. 1 and 2, sections 3 and 5, disposed along the front wall of the room, and a section 7 branching off from the sections 3 and 5, along an intermediately disposed partition wall 27, running substantially parallel to the left-hand wall. The raceway sections 1, 3, 5 and 7 are illustrated as of conventional multiple-sided type, of rectangular cross section, and provided with respective front side walls 11, 13, 15 and 17, hinged to the bottom walls. These front side walls are shown turned down about their hinges, in order to provide open spaces through which to insert the electric-wire conductors into the raceway system. The front side walls 11 and 13 are disposed in planes that intersect, for example, at right angles, as do the planes of the front side walls 13 and 15, and 15 and 17. The sections 1 and 3 are shown joined by a raceway elbow fitting 32, for carrying the conductors along a direction out of the plane of the front side wall 11 of the raceway section 1, shown as an orthogonal direction, the details of which are more fully illustrated in Fig. 5. The sections 3, 5 and 7 are shown joined by a raceway T-fitting 34, more fully illustrated in Fig. 4.

The raceway system of Figs. 1 and 2 may be designed to carry electric-wire conductors for feeding electric energy to a plurality of machines, two only of which are shown at A and B, disposed at different locations. The machines A and B may, for example, be three-phase electric motors, energized by three wire conductors 9, 19 and 29.

The wires 9, 19 and 29 may first be spread out along the floor adjacent the raceway sections 1, 3 and 5, and draped over the raceway T-fitting 34 at the junction of the wireway sections 3 and 5, as illustrated in Fig. 1. At the junction of the raceway sections 3 and 5, it is assumed that a three-wire splice or other connection will be made, as shown at 21, 23 and 25, in order that three further wire conductors 109, 119 and 129, also shown in Fig. 1 on the floor, may be joined to the respective conductors 9, 19 and 29. The wire conductors 109, 119 and 129 are shown connected to feed energy along a direction illustrated as at right angles to the plane of the front side wall 13 of the raceway section 3, to the machine A. Three further wire conductors 209, 219 and 229 are also shown in Fig. 1 laid out along the floor, for feeding electric energy to additional machines, not shown, disposed along the partition wall 27. These wire conductors are shown connected to the wire conductors 109, 119 and 129, respectively, by further splices 121, 123 and 125. The wire conductors 9, 19 and 29 are shown also spliced or otherwise joined at 221, 223 and 225 to three further conductors 309, 319 and 329, for feeding energy to the machine B. The wire conductors 9, 19, 29 may also continue along the front wall to further machines, not shown.

The present invention makes it possible to throw the completed, spliced wire assembly illustrated in Fig. 1 directly into the raceway, as illustrated by Fig. 2, and even into the lower portions 33 of the respective elbow and T-fittings 32 and 34, without the necessity for threading or other operations attendant upon the use of present-day raceway systems. These fittings may then be closed with the aid of their upper portions 31.

These fittings will now be described. Each fitting is constituted of an upper substantially U-shaped member 31 and a lower substantially U-shaped member 33 separable therefrom in a direction, shown vertical, substantially parallel to the planes of the open side walls of the raceway sections. These members 31 and 33 may be constituted of steel or other metal, formed plastic, pressed wood, pressed glass fibers, or any other suitable formable material. They may be provided, if desired, with perforations 36, Fig. 7, which perforations would permit of threading the free ends of the conductors through, into the fitting, at any desired point. They may also be made, with this end in view of netting-like material, with, say, one-quarter-inch mesh, or expanded metal with any desired size of openings. In fact any material with any shape of openings may be used.

Referring, first, to the raceway T-fitting 34, its upper member 31 is shown in Fig. 4 provided, along its bottom edge, with a flange 37 for overlapping a flange 39 of its lower member 33. The upper and lower members 31 and 33 may be joined together in any desired manner.

It is preferred to join them by screws or other devices 35 passed through openings in the flange 37, the flange 39, or both, and through openings 40 in a collar 41 that is disposed at the junction of the fitting 34 and its adjacently disposed section 3 or 5. It is to be understood, of course, that the members 31 and 33 may be adapted for connection and separability in other ways also.

The left-hand-end opening of the T-fitting 34, as shown in Fig. 4, is joined to the raceway section 3; the right-hand-end opening, to the raceway section 5; and the intermediately disposed end opening, to the raceway section 7. The top, bottom, front and rear sides of the closed T-fitting 34, near these openings, correspond, respectively, to the top, bottom, front and rear sides of the adjacently disposed raceway sections. These openings of the T-fitting 34 are joined to the respective raceway sections by means of the said collars 41. The collars 41, in turn, have sides that correspond, respectively, also, to the sides of the adjacently disposed raceway sections 3, 5 and 7. The collars 41 are each provided with top and bottom sides 43 and 45, a rear side 47 joining the top and bottom sides, and a front side 49 that is provided with an opening 42 thereabove, under the side 43. The opening 42 is alined with and corresponds to the before-described open spaces of the raceway sections 3, 5 and 7, when the front side walls 13, 15 and 17 are turned down about their hinges.

The collars 41 extend beyond the three ends of the fitting 34, as shown in Fig. 4, in order that they may engage also the respective raceway sections 3, 5 and 7, to which the collars 41 may be secured by screws 35 or other devices extending through alined openings 40 in the collars and the raceway sections.

The top wall of the upper portion 31 of the T-fitting 34 and the bottom wall of its lower portion 33 constitute the necks of the respective U's of these two portions. The flanges 37 and 39 constitute the arms of these U's. The neck of the upper portion 31 and the neck of the lower portion 33 are therefore disposed adjacent to the upper and lower sides of the raceway, respectively, and the arms 37 and 39 are disposed adjacent to the two sides disposed adjacent to these upper and lower sides.

When the upper member 31 of the T-fitting 34 is separated from the lower member 33, as shown in Fig. 2, therefore, the left-hand and right-hand portions of the wire conductors 9, 19 and 29, on both sides of the splices 21, 23 and 25, as well as the spliced end portions of the wire conductors 109, 119 and 129, may be directly inserted into the lower section 33 of this T-fitting. This is permitted by the openings 42 in the collars 41 respectively joining the T-fitting 34 to the respective raceway sections 3, 5 and 7. After these conductors have been so inserted in these raceway sections, they will be held in place therein by the front sides 49 of these collars 41.

The elbow-fitting 32, Fig. 5, joining the raceway sections 1 and 3, is of precisely the same type of construction as the T-fitting 34. Collars 41 of the same nature, may be similarly employed to join this elbow-fitting to the ends of the adjacently disposed raceway sections 1 and 3.

Once the wire assembly has been thrown into the raceway system, as illustrated in Fig. 2, the separable members 31 of the T-fitting 34 and of the elbow-fitting 32 may be joined to the other members 33, and the open spaces of the respective raceway sections 1, 3, 5 and 7 may be closed, by hinging the side walls 11, 13, 15 and 17, to complete the installation.

Though the collars 41 are shown in Figs. 1, 2, 4 and 5 as inserted partly within the terminal openings of the elbow or T-fittings 32 and 34, this is only for illustrative purposes. The collars 41 could, of course, be disposed on the outside of these fittings, as well. With the collars 41 in the inside, however, the raceway sections may be joined flush with these fittings, thus to present a smooth outer-surface appearance. It is to be understood, furthermore, that, while fittings of substantially rectangular cross-section have been illustrated and described, fittings of other geometrical cross-sections may also be utilized, such as circular, elliptical or square.

The invention is not, furthermore, restricted to T-fittings and elbow-fittings. Many other types or shapes of fittings may equally well be employed. In Fig. 6, as another illustration, a raceway cross-fitting is shown, with the aid of which connections of wire conductors may be effected in and out of four terminal openings, displaced from one another by ninety degrees. The cross-fitting of Fig. 6 is of precisely the same nature as the T-fitting 34 of Fig. 4 and the elbow-fitting 32 of Fig. 5, having similar upper and lower separable members 31 and 33, and similarly provided with the collars 41 at the terminal openings of the cross-fitting.

While, moreover, the particular fittings discussed in connection with Figs. 4, 5 and 6 are particularly adapted for use along the wall of a room near the floor, the fittings may, of course, be utilized near the ceiling or in other locations, in which event the sections may, if desired, be made separable in other ways, and the associated collars 41 may be provided with their open sections 42 differently oriented. The fittings may be disposed vertically, horizontally, or at any other orientation.

Further modifications will occur to those skilled in the art and all such are considered to fall within the spirit and scope of the present invention as defined in the appended claims.

What is claimed is:

1. In a four-sided raceway for carrying along a predetermined direction tubes, wires, cables and other conductors and one of the four sides of which is open in order that the conductors may be inserted therethrough into the raceway, a fitting for carrying the conductors along a different direction out of the plane of the said one side comprising two members separable in a direction substantially parallel to the said plane and substantially U-shaped in cross section, one of the two members being adapted to be mounted upon the raceway with the neck of its U disposed adjacent to one of the sides of the raceway and with the arms of its U disposed adjacent to the two sides adjacent to the said one side of the raceway, the other member being adapted to be mounted upon the raceway with the neck of its U disposed adjacent the fourth side of the raceway and with the arms of its U disposed adjacent to the said two sides of the raceway, and a four-sided collar for joining the fitting to the raceway adapted to be mounted upon the fitting with its four sides in engagement with the respective four sides of the fitting at the junction of the fitting with the raceway, one of the sides of the collar being open to correspond to the open side of the raceway in order to permit the conductors to be inserted into the fitting and the raceway when the said two members are separated.

2. In a four-sided substantially rectangular raceway for carrying along a predetermined direction tubes, wires, cables and other conductors and one of the four sides of which is open in order that the conductors may be inserted therethrough into the raceway, a fitting for carrying the conductors along a different direction out of the plane of the said one side that is substantially rectangular in cross-section comprising two members separable in a direction substantially parallel to the said plane and substantially U-shaped in cross section, one of the two members being adapted to be mounted upon the raceway with the neck of its U disposed adjacent one of the sides of the raceway and with the arms of its U disposed adjacent to the two sides adjacent to the said one side of the raceway, the other member being adapted to be mounted upon the raceway with the neck of its U disposed adjacent the fourth side of the raceway and with the arms of its U disposed adjacent to the said two sides of the raceway, and a four-sided substantially rectangular collar for joining the fitting to the raceway adapted to be mounted upon the fitting with its four sides in engagement with the respective four sides of the fitting at the junction of the fitting with the raceway, one of the sides of the collar being open to correspond to the open side of the raceway in order to permit the conductors to be inserted into the fitting and the raceway when the said two members are separated.

3. In a raceway system having a plurality of four-sided raceway sections for carrying along a plurality of directions tubes, wires, cables and other conductors and one of the four sides of each of which is open in order that the conductors may be inserted therethrough into the raceway section, the plane of one or more of the said one sides of one or more of the raceway sections intersecting the plane of one or more of the said one sides of one or more of the other raceway sections, a fitting for the plurality of raceway sections comprising two members separable in a direction substantially parallel to all of the said planes and substantially U-shaped in cross section and provided with a plurality of junctions, one corresponding to each raceway section, for respectively joining the plurality of raceway sections, one of the two members being adapted to be mounted upon the raceway system with the neck of its U at each junction disposed adjacent to one of the sides of the corresponding raceway section and with the arms of its U at each junction disposed adjacent to the two sides adjacent to the said one side of the corresponding raceway section, the other member being adapted to be mounted upon the raceway system with the neck of its U at each junction disposed adjacent the fourth side of the corresponding raceway section and with the arms of its U at each junction disposed adjacent the said two sides of the corresponding raceway section, and a plurality of four-sided collars each adapted to be mounted upon the fitting with its four sides in engagement with the respective four sides of the fitting at the junctions of the fitting with each raceway section, one of the sides of each collar being open to correspond to the open side of the corresponding raceway section in order to permit the conductors to be inserted into the fitting and the raceway sections when the said two members are separated.

References Cited in the file of this patent

UNITED STATES PATENTS

| | | |
|---|---|---|
| 1,132,671 | Murray | Mar. 23, 1915 |
| 1,590,569 | Fisk | June 29, 1926 |
| 1,986,965 | Frank | Jan. 8, 1935 |
| 1,992,574 | Jenkins | Feb. 26, 1935 |
| 2,275,203 | Rudd | Mar. 3, 1942 |

FOREIGN PATENTS

| | | |
|---|---|---|
| 476,871 | Great Britain | Dec. 13, 1937 |
| 907,231 | France | Mar. 6, 1946 |